United States Patent Office 3,637,635
Patented Jan. 25, 1972

3,637,635
TREATMENT OF RUBBERY POLYMERS WITH LEWIS ACIDS
Ernest J. Buckler, Hugh K. Coulthart, Nathan J. Mc-Cracken, and Mieczyslaw Marcinkowski, Sarnia, Ontario, Canada, assignors to Polymer Corporation Limited, Sarnia, Ontario, Canada
No Drawing. Filed Jan. 27, 1964, Ser. No. 340,546
Int. Cl. C08d 5/00, 5/02, 5/04
U.S. Cl. 260—94.7 R    7 Claims This invention relates generally to improving the processability of high molecular weight butadiene polymers. More particularly, the invention relates to the process of improving the processability of polybutadiene which is at least 85% in the 1,4 configuration and to the polymers so produced.

Since the development of the emulsion polymerization process, polymers of butadiene have occupied a predominant position in the synthetic rubber field. However, commercial interest in butadiene polymers has been limited to copolymers of butadiene with styrene, acrylonitrile or other comonomers. Homopolymer of butadiene have been known to have such poor processing properties that the polymers do not adhere to the mill rolls when black is added, and the milled sheets produced are full of holes unless their Mooney viscosity is very low which is generally regarded as undesirable for the best physical properties.

Commercial interest in polybutadiene has recently been re-awakened as a result of the advances made in the so-called stereospecific polymerization processes which are capable of producing polybutadiene which is at least 85% in the 1,4 configuration. It has been possible to prepare, using newly developed processes and catalysts, a number of such rubbery homopolymers of butadiene which show excellent dynamic properties along with many other desirable features such as good stability to heat and excellent resistance to abrasion. Three main types of such homopolymers have been commercially developed, namely: a polybutadiene of a 75–94% cis-1,4 content produced using a catalyst comprised of titanium tetraiodide and a trialkyl aluminium; a polybutadiene of a higher cis-1,4 content (up to about 98%) produced using a catalyst comprised of a cobalt salt and an alkyl aluminium chloride; and a polybutadiene of an intermediate cis-1,4 content produced using a lithium alkyl. These three types have been found to be generally as difficult to process as the emulsion polybutadienes. It is characteristic of polybutadiene that on the addition of the usual amounts of carbon black and other compounding ingredients the Mooney viscosity frequently more than doubles, the compounds crumble, and the carbon black cannot be properly dispersed.

Various methods have been proposed for overcoming the processing difficulties of rubbery polybutadiene. Some success has been achieved by controlling the Mooney viscosity to a level of about 20 to 30. However, the physical properties, in particular the dynamic properties, of low molecular weight polybutadienes are generally not satisfactory. An improvement in processability has been achieved also by blending the polymer with a hydrocarbon oil. The amount of hydrocarbon oil required varies from 5 to about 130 parts per 100 parts of polymer, depending on the Mooney viscosity and the amount of carbon black used. Blends of butadiene polymer with natural rubber or styrene-butadiene rubber have been reported to possess improved processability. The disadvantage of these methods is that they lower the physical properties of the rubbery product.

The object of this invention is to provide a process of modifying a rubbery polymer of butadiene to produce a product having improved processability.

The object of this invention is achieved in the process of modifying a rubbery polymer of butadiene which comprises treating a substantially gel-free rubbery polymer of butadiene with a sufficient quantity of a Lewis acid to produce a substantially gel-free modified polymer having a Mooney viscosity which is at least 5 Mooney points higher than that of the unmodified polymer.

In one of its specific aspects the object of the invention is achieved in the process of modifying a rubbery polymer of butadiene which comprises treating a substantially gel-free polybutadiene in which at least 75% of the monomer units are in the cis-1,4 configuration and having a Mooney viscosity of about 10 to 70 which comprises treating said rubbery polybutadiene at a temperature below 70° C. while dissolved in an inert organic liquid with 0.3 to 5% by weight based on the polymer of titanium tetrachloride under conditions suitable for producing a substantially gel-free modified polybutadiene having a Mooney viscosity between 20 and 80 and at least 10 Mooney points higher than that of said rubbery polybutadiene and recovering said modified polybutadiene from solution in said organic liquid.

An additional advantage of the invention is that the polymers which have been modified according to the invention show less tendency for cold flow than do the unmodified polymers. For example, it is quite common for polybutadiene having a Mooney viscosity below about 40 to flow at room temperature so that particles flow into a compact mass and bales or blocks lose their shape thus creating great inconvenience and expense in shipping or packaging. The tendency for cold flow of such polybutadienes is greatly reduced by treating them according to the present invention and may even be essentially eliminated.

Mooney viscosities (ML-4 @ 100° C.) referred to in this specification are determined at 100° C. as described in ASTM-D927-55T and represent the viscosity readings obtained using the large rotor, after four minutes running time. This term and the method of designating viscosity values of rubber polymers are universally used and understood throughout the rubber industry.

The term "butadiene" as used throughout this specification refers to butadiene-1,3 and is not intended to include butadiene-1,2 or derivatives of butadiene such as chloroprene or isoprene. The term "substantially gel-free" is used to describe polymers which are about 95–100% soluble in toluene at room temperature.

The process of the invention is carried out on a substantially gel-free rubbery polymer of butadiene having a Mooney viscosity in the range of about 5 to 100. Although a solid polymer having a Mooney viscosity less than 5 may be modified according to the process of the invention, the product when vulcanized, yields a vulcanizate of rather poor physical properties. The upper limit of the Mooney viscosity is not critical, although it is practically defined by the substantial absence of gel. For instance, a polymer of butadiene having a Mooney viscosity above 100 can be used in accordance with the process of the invention, although it is difficult to go much above this level without producing significant amounts of gel. The preferred range of the Mooney viscosity is between 10 and 70, although the best results are obtained within the narrow range between 15 and 45 Mooney. In the latter range, the benefits of the process are observed in that modified polymers are obtained which can be processed satisfactorily without using other means of facilitating processing such as blending the polymer with hydrocarbon oil or natural rubber. While modified polymers produced from the higher Mooney polymers require the use of such other means for suitable processing, less hydrocarbon oil or natural rubber is required than would otherwise be the case.

The rubbery polymers of butadiene which may be used in the process of the invention may be prepared using any of various polymerization systems and catalyst systems. For instance, polybutadiene may be prepared in a hydrocarbon medium using a lithium alkyl. Such polymers have about 88% of the monomer units linked in the 1,4 position with 30–40% of the 1,4 units in the cis-1,4 configuration. Rubbery polymers of butadiene may also be produced in the presence of a so-called Ziegler catalyst, i.e. a transition metal compound used in combination with an organometallic compound. The microstructure of such polymers may vary from essentially complete cis-1,4 configuration to about 80% of the units in the trans 1,4 configuration. The total content of the monomer units linked in the 1,4 position is at least 85%. The polymer having at least 75% of the units in the cis 1,4 configuration is preferred, and the process is of particular advantage in treating polymers in which at least 90% of the units are in the cis-1,4 configuration.

The Mooney viscosity of polymers produced using a particular catalyst system may be regulated by a variety of means such as choice of catalyst level, type of diluent, reaction temperature, monomer concentration and the use of modifiers which affect the molecular weight. Not all of these means are equally effective with all catalyst systems but they are known and those skilled in the art can readily select the means which is most effective for a particular system.

The term "Lewis acid" used in this specification, in accordance with the broad definition proposed by G. N. Lewis means a substance capable of accepting one or more electron pairs and forming a coordinate bond or bonds with a "Lewis base" which is a substance capable of donating at least one electron pair. In addition to known acids such as hydrogen halides, sulphuric acid, and phosphoric acid, the term "Lewis acid" includes substances which do not contain hydrogen such as aluminium trihalides, boron trihalides, titanium tetrahalides, ferric chloride, cobaltic chloride, stannic halides, and the like. Hydrocarbon substituted halides of the above metals such as alkyl aluminum halides, aryl boron halides, alkyl titanium halides, alkyl tin halides, alkyl or aryl magnesium halides, aryl phosphorus chloride and the like can be successfully used. Other organic substituents such as alkoxy, phenoxy, or carboxy radicals may also be present in such compounds in place of or in addition to the hydrocarbon substituents. The preferred Lewis acids are hydrogen chloride, aluminium trichloride and titanium tetrachloride. Of these, titanium tetrachloride is the most practical as it permits a more readily controllable and reproducible reaction than the other compounds.

The amount of a Lewis acid required in the treatment of the butadiene polymer depends on many factors such as the activity of the acid, impurities present in the polymer, temperature, and time of treatment. It may vary from 0.1% to 10% based on the weight of polymer. When a large amount of Lewis acid is used, the time and temperature of treatment must be controlled in order to avoid undesired side-reactions such as gelation or cyclization of the polymeric chains. The most useful amount is between 0.3 and 5% based on the weight of polymer. However, for best results the range from 0.5 to 3% is preferred. The treatment may be carried out over a wide range of temperatures between 0 and 150° C., although the most convenient and preferred range is from 10 to 70° C. In practice, the process is carried out most conveniently near the temperature of dissolution of the polymer or the temperature at which the polymer is produced.

The time of treating the butadiene polymer depends on the amount of Lewis acid employed and may vary from a very short period such as 30 seconds to a period of several hours. In the presence of a small amount of a Lewis acid, the time of treating may be extended to 24 hours or more.

The treatment is preferably carried out while the polymer is dispersed or dissolved in an inert solvent, although the use of such a solvent is not essential. For instance, solid polymer can be treated on a mill or in an internal Banbury mixer although it is desirable to take precautions to prevent corrosion of the equipment. The amount of solvent may vary within wide limits, from about 1:1 to 50:1 weight ratio of solvent to polymer. The preferable ratio is from about 5:1 to 10:1. Suitable solvents are paraffins, cycloparaffins, aromatic hydrocarbons, monolefinic hydrocarbons and halogenated hydrocarbons or mixtures thereof. The lower molecular weight solvents such as butane or pentane are particularly useful for easy recovery of the modified polymer. Higher molecular weight solvents such as cyclohexane, benzene, toluene, isooctane, ethylene chloride, chlorobenzene are preferred when the solid polymer is dissolved before treatment. Polymers from polymerization reactions in which the product is obtained as a solution may be treated in solution as produced. Frequently such polymer solution contains residues of a catalyst, at least one component of which is a Lewis acid so that the addition of further Lewis acid may not be necessary. However, in this case it is desirable to add a small amount of a compound which stops or reduces the polymerization activity of the catalyst, but does not destroy the acidity of the acidic component. The following compounds may be used as stoppers: water, alcohols, amines, phenols, ketones, ethers and the like. The amount of stopper should not be more than 1 mole per mole of Lewis acid. For instance, a cis-1,4 polymer of butadiene produced in a hydrocarbon medium in the presence of a catalyst system comprising a cobalt salt and an organo-aluminum halide can be treated to produce a modified polymer of butadiene by that portion of the organo-aluminum halide which remains after incomplete stopping of the polymerization reaction by the addition of less than one mole of water per mole of organo-aluminum halide. The Mooney viscosity of the polymer increases and a modified polymer is obtained within a few hours, the degree of modification depending on the amount of active organo-aluminum halide remaining in the solution.

The mechanism of the reaction taking place during the treatment is not understood. The process of this invention appears to be related to the process of isomerization. However there is a very significant difference in that in practicing the present process the polymer is treated under mild conditions and throughout the treatment it remains soluble and unchanged in appearance.

In the process of isomerization, on the other hand, the polymer of butadiene is heated in the presence of e.g. chlorostannic acid or boron fluoride to a temperature above 150° C. whereby polymer solution in higher boiling solvents passes through a gel stage and then, a thinning stage in which polymer regains its solubility in aromatic solvents. Although the polymer when treated in the present process does not appear to change, it toughens and on stretching does not tear at low elongation as readily as the untreated polymer. It shows an increase in Mooney viscosity which may range from as low as 5 to as high as about 60 Mooney points. A Mooney rise of at least 10 points and preferably at least 25 points is desired for the best improvement in polymer properties. It is quite surprising that the treated polymer has improved processing characteristics compared to those of an untreated polymer of the same Mooney viscosity. The modified polymer of butadiene prepared according to the invention is characterized by an improvement in the ease of processing on conventional rubber processing equipment and by improved physical properties of the unvulcanized carbon black reinforced compounds. There is a significant and surprising difference in the dynamic properties. When modified and unmodified polymers of the same Mooney viscosity and produced using the same catalyst system are milled under identical conditions, the modified polymer shows considerably better adhesion to the mill rolls and better cohesion than the untreated polymer. For instance, the polymer which has been modified by treatment according to the present invention, and having a Mooney viscosity between 35 and 50, readily forms a continuous smooth sheet which adheres firmly to the mill roll, and a rolling bank in the nip between the rolls. The unmodified polymer having a Mooney viscosity between 35 and 50 under the same conditions slips off and hangs loosely on the roll, i.e. bags, so that continuous manual feeding of the polymer to the nip of the mill is necessary. The resulting sheet is full of holes with jagged edges and coarse surfaces. This difference in the milling behaviour persists after the addition of carbon black. The modified polymer absorbs it readily, irrespective of whether the carbon black is added on an open mill or in a Banbury mixer, while the unmodified polymer remains dry, flaky and the carbon black can be easily rubbed off. The differences are also manifested in the Mooney viscosity rise on the addition of carbon black. The modified polymer shows a smaller increase in Mooney viscosity than prior art polymers, when compounded with carbon black. For example, the Mooney viscosity of unmodified high 1,4 polybutadiene which has been compounded with 50 parts of intermediate super abrasion furnace black (ISAF) has a Mooney viscosity (Compound Mooney) which is double to triple that of the uncompounded polybutadiene. On the other hand, using the present invention, it is possible to produce modified polybutadiene in which the compound Mooney viscosity is less than double that of the raw polymer. For example, a modified polybutadiene having a raw polymer Mooney viscosity of 40 to 70 shows a Mooney rise of 10 to 70 points so that a modified 70 Mooney polymer has a compound Mooney of not more than 140. The polybutadienes which have been treated in accordance with this invention also have an advantage over the unmodified polybutadienes in that they respond more readily to prior art methods of facilitating compounding and processing. For example, modified polymers having a Mooney viscosity of more than 50 may be easily blended with hydrocarbon oil, natural rubber or synthetic rubbers and process more readily on conventional rubber processing equipment than unmodified polymers having the same Mooney viscosity.

A conventional method of evaluating the processability of rubbery polymers is by extrusion tests in which the compounds containing carbon black and vulcanizing agents are extruded through a die known in the art as a Garvey die. The weight and the linear length of the material extruded in a given period of time is measured and the appearance of the extrudate surface and edges rated visually. It is found that the extrusion rate of the compounds of the modified polymers of the present invention is surprisingly higher than that of unmodified polymers produced using the same catalyst system and having the same Mooney viscosity and even approaches the extrusion rate of natural rubber and SBR. Furthermore, the physical properties of the vulcanized compositions containing modified polymers are comparable to and in many respects better than those of unmodified polymers.

The advantages of this invention are shown in detail in the following examples which are included for the purpose of illustration rather than of limitation of the invention.

EXAMPLE 1

A rubbery polybutadiene having a Mooney viscosity (ML-4 @ 100° C.) of 26, an intrinsic viscosity of 2.10 and a cis-1,4 content of 96.0% was treated with $TiCl_4$. 1400 grams of an 8.3% solution of the polymer in dry benzene was placed in a 2 liter glass jug which had been previously dried. The solution and the vapor space above the solution were then purged by bubbling dry nitrogen through them at a moderate rate for about 30 minutes while the solution was agitated mildly. 5.6 milliliters of a 1-molar solution of $TiCl_4$ in benzene was then added and uniformly mixed into the solution. The jug was then capped and the solution stored for 22 hours at about 24° C. An excess of acetone containing about 1% by weight of disobutyl p-cresol was next added to the solution in order to precipitate the polymer. The polymer was then separated from the liquid phase and dried in vacuo at 45° C. for about 16 hours. The recovered polymer was completely soluble in benzene and had a Mooney viscosity (ML-4 @ 100° C.) of 38.5 and an intrinsic viscosity of 2.20.

For comparative purposes, a sample of untreated polybutadiene produced using the same catalyst system and having a Mooney viscosity of 36 and a cis-1,4 content of 96.0% was used as a control. It was not treated with titanium tetrachloride.

These two polymers were then compounded on a cold 6″ x 12″ laboratory mill using the following recipe:

100 parts polymer
50 parts ISAF carbon black
5 parts zinc oxide
1 part condensation product of diphenyl amine and acetone
3 parts oleic acid The milling behaviour of the polymers was observed before and after the addition of carbon black. The compound Mooney viscosity (CP-ML-4 @ 100° C. was determined and each compound was extruded through a Garvey die. The compounding and extrusion characteristics are shown in Table 1.

TABLE I

|  | Control polymer | Treated polymer |
| --- | --- | --- |
| Mooney (ML-4 at 100° C.) | 36 | 38.5 |
| Milling behaviour: |  |  |
| Before the addition of black | (1) | (2) |
| After the addition of black | (1) | (3) |
| Compound Mooney | 67 | 64 |
| Compounding time (min.) 4 | 17 | 14 |
| Extrusion 104° C., Garvey die, rate (gms./min.) | 72.5 | 88 |

1 Baggy.
2 Very good.
3 Slightly baggy.
4 Time required to incorporate all carbon black.

The polymer treated with titanium tetrachloride showed improved millability and extrudability when compared to the control polymer even though the latter had a Mooney viscosity 2.5 points lower than the treated polymer.

EXAMPLE 2

Another portion of the untreated polybutadiene of Example 1 was dissolved in dry benzene to form a 4.3% solution. 2800 gms. of the solution was purged with dry nitrogen in the manner described in Example 1. 12 milliliters of a one-molar solution of titanium tetrachloride in benzene (2.28 gms. of $TiCl_4$) were then added to the solution. The solution was mixed and stored at about 24° C. for 17 hours. At the end of this period the polymer was precipitated, separated from the liquid phase, and dried as described in Example 1. The recovered polymer, having a Mooney viscosity of 59.5, was blended on a cold 6″ x 12″ mill with the following materials, (in parts by weight on 100 parts of polymer): 3 parts of a noncurable condensate of formaldehyde and octyl phenol; 3 parts oleic acid; and 8 parts of a naphthenic rubber extender oil. An unmodified polybutadiene produced using the same catalyst system and having a Mooney viscosity of 59 and a cis-1,4 content of 96% was used as a control and treated in the same way.

The blends were then milled for 15 minutes, their behaviour on the mill observed, and their Mooney viscosities measured. The blends were next compounded using the following recipe in parts by weight: 114 parts of the blend; 55 parts of ISAF carbon black; 5 parts of zinc oxide; 1 part of a condensation product of diphenyl amide and acetone; 1.5 parts of n-cyclohexyl-2-benzothiazole sulphenamide; and 1.5 parts of sulphur. The extrusion characteristics of the compounds were determined. On the vulcanizates, the tensile properties were measured in the conventional manner on an Instron Tester and the flex cracking characteristics were determined using a Goodrich Flexometer. The data are shown in Table II.

TABLE II

| | Control polymer | Polymer treated with TiCl₄ |
|---|---|---|
| Mooney viscosity: | | |
| Raw polymer | 59 | 59.5 |
| Blend | 34.5 | 27.5 |
| Compound | 67.0 | 46.5 |
| Milling behaviour: | | |
| Before the addition of black | (¹) | (²) |
| After the addition of black | (³) | (⁴) |
| Extrusion at 104° C., Garvey die, rate (gms./min.) | 76.0 | 100.5 |
| Appearance of extrudate: | | |
| Surface | (⁵) | (⁶) |
| Edge | (⁷) | (⁷) |
| Physical properties of compounds cured 25 minutes at 145° F.: | | |
| Tensile (p.s.i.) | 1,890 | 2,075 |
| Elongation (percent) | 290 | 315 |
| 300% modulus (p.s.i.) | | 1,960 |
| 100% modulus (p.s.i.) | 365 | 115 |
| Tear (lbs./inch) | 165 | 180 |
| Hardness-Shore A2 | 61 | 60 |
| Goodrich Flexometer test: | | |
| Flex life (kcy./inch) | 7.2 | 14.41 |
| Initial dynamic compression (percent) | 4.85 | 6.99 |
| Heat build up (° C.) | 23.6 | 24.4 |
| Percent rebound | 76.5 | 75.2 |

¹ Baggy.
² Very good.
³ Slightly baggy.
⁴ Fair.
⁵ Medium smooth.
⁶ Smooth.
⁷ Fine.

The polymer treated with titanium tetrachloride showed remarkably good processability as evidenced by good milling behaviour, low compound Mooney, a fast extrusion rate and a good appearance of the extrudate. The tensile properties of the vulcanizates were equivalent to those of the control except that the flex life was better.

EXAMPLE 3

A 95% cis-1,4 polybutadiene in a benzene-butene mixture was modified according to the present invention. The polymer was produced using diethyl aluminum chloride and a cobalt salt and the solution contained 0.15% of diethyl aluminum chloride and 13.3% of polybutadiene the Mooney viscosity of which was 17.5. To 225 lbs. of the solution were added 0.3 lb. of ditertiary-butyl p-cresol dissolved in 0.6 lb. of benzene and 0.2 lb. of titanium tetrachloride dissolved in 0.4 lb. benzene and the mixture was agitated for 7 hours at 20° C. One-litre samples were withdrawn at one hour intervals. The polymer from each of these was recovered and dried and the Mooney viscosity determined. The Mooney viscosity increased with time as follows:

| Time of sample, hrs. | Mooney viscosity |
|---|---|
| 1 | 24.5 |
| 2 | 39 |
| 3 | 50 |
| 5 | 52 |

The polymer from a large sample of approximately 10 gallons withdrawn after about 7 hours treatment was precipitated by the addition of about 4 gallons of a 1% solution of ditertiary butyl p-cresol in acetone, then separated from the liquid phase and dried in vacuo at 50° C. The recovered polymer had a Mooney viscosity of 58.5. It was next compounded on a cold mill with 50 parts of an intermediately super abrassion furnace black, 5 parts of zinc oxide, 1 part of a condensation product of diphenyl amine and acetone, 3 parts of oleic acid, 1.0 part of n-cyclohexyl-2-benzthiazole sulphenamide and 1.5 parts of sulphur and then cured at 145° C. for 25 minutes. The extrusion characteristics and physical properties of the cured compounds are presented in Table III.

TABLE III

| | |
|---|---|
| Garvey die extrusion, extrusionrate at 104.5° C. (gms./min.) | 84 |
| Extrudate appearance: | |
| Surface | (¹) |
| Edge | (²) |
| Physical properties of vulcanizate cured for 25 min. @ 145° C.: | |
| Tensile strength (p.s.i.) | 1830 |
| Elongation (percent) | 380 |
| 300% modulus (p.s.i.) | 1210 |
| Tear strength (lbs./in.) | 270 |
| Hardness, Shore A-2 | 51 |
| Goodrich Flexometer Test: | |
| Flex life (kcy./inch) | 20.7 |
| Initial dynamic compression (percent) | 9.0 |
| Heat build up (° C.) | 39 |

¹ Intermediate smooth.
² Medium fine.

EXAMPLE 4

A 96% cis-1,4 polybutadiene was modified by postpolymerization treatment of the polymer in solution with a residue of the polymerization catalyst.

Two 1-liter samples of a 13% solution of polybutadiene were withdrawn from a reactor at the end of a polymerization reaction in which the polymerization was carried out in the presence of benzene using a catalyst comprising diethyl aluminum chloride and a cobalt salt. The solution contained 0.13% of diethyl aluminum chloride. One sample was treated with 15 milliliters of water-saturated benzene to give a water concentration of about 15 p.p.m. of total solution. The second sample which served as a control was treated with 10 milliliters of a 1% solution of ditertiary butyl-p-cresol in acetone in order to completely destroy the catalyst and stabilize the polymer. Both samples were held for about 2 hours at room temperature (about 20° C.) after which 300 milliliters of a 1% solution of ditertiary butyl p-cresol in acetone were added to each in order to precipitate the polymers which were then separated from the liquid phase and dried in vacuo. The treated polymer was completely soluble although its Mooney viscosity had increased markedly as shown in Table IV.

TABLE IV

| | Control sample | Treated sample |
|---|---|---|
| Solution viscosity | (¹) | (²) |
| Mooney viscosity | 58 | 92 |
| Intrinsic viscosity | 2.80 | 2.96 |

¹ Unchanged.
² Increased in 30 min.

EXAMPLE 5

Rubbery polybutadiene produced by polymerizing butadiene in the presence of benzene and using lithium butyl as catalyst was treated with titanium tetrachloride. Three separate samples of the polymer were produced. Unreacted butadiene was allowed to flash from the solution while excluding air but the catalyst was not destroyed. The solutions were treated with a variable amount of one-molar solution of titanium tetrachloride in benzene. The treatment was carried out at a temperature of about 20° C. The polymers remained completely soluble and were recovered and their Mooney viscosities determined. The results are presented in Table V.

TABLE V

| Polymer Sample No | 1 | 2 | 3 |
|---|---|---|---|
| TiCl₄ charge (wt. percent on polybutadiene) | 0.75 | 1.18 | 1.26 |
| Time of treating (hours) | 4 | 20 | 3 |
| Mooney viscosity: | | | |
| Before the treatment | 35 | 28 | 25 |
| After the treatment | 41.5 | 41.5 | 35 |

The structure of Sample #1 was determined by infrared spectroscopy and it was found that 56.5% of the monomer units were in the trans-1,4 configuration, 31.2% in the cis-1,4 configuration and 12.3% in the 1,2 configuration.

Samples of both the untreated and treated polymers were allowed to rest on a table at room temperature for one day. The samples of the untreated polymers flowed or changed their shape significantly (i.e. exhibited cold flow) whereas the treated polymers did not show a detectable amount of cold flow.

We claim:

1. A process of modifying a substantially gel-free rubbery polymer of butadiene prepared in the presence of a Ziegler catalyst and having at least 75% of the butadiene units in the cis-1,4 configuration which comprises treating said polymer of butadiene having a Mooney viscosity of about 10 to 70, while dispersed in an inert organic liquid, with between 0.3 and 5% by weigth of the butadiene polymer of a Lewis acid selected from the group consisting of hydrogen chloride, aluminum trichloride, titanium tetrachloride and a product of incomplete stopping of a polymerization catalyst comprising a cobalt salt and an organo-aluminum chloride, with less than equimolar amount of a catalyst stopper, to produce a substantially gel-free modified polymer of butadiene having a Mooney viscosity which is at least 5 Monney points higher than that of the unmodified polymer.

2. The process of claim 1 wherein said Lewis acid is titanium tetrachloride.

3. The process of claim 1 wherein the rubbery polybutadiene is treated at a temperature below 70° C.

4. The process according to claim 3 wherein the rubbery polymer of butadiene is a polybutadiene having a Mooney viscosity of about 15 to 45, the treatment with Lewis acid is carried out on a solution of said polybutadiene in an inert organic liquid whereby the Mooney viscosity of said polybutadiene increases by at least 10 points, and a substantially gel-free modified polybutadiene is recovered from said solution, said recovered polybutadiene having a Mooney viscosity of between 40 and 70 and being more processable than the unmodified polybutadiene of corresponding Mooney viscosity.

5. The process of claim 1 wherein the rubbery polymer of butadiene is a polybutadiene produced in the presence of a catalyst system comprising an alkyl aluminum chloride and a cobalt compound and the Lewis acid is that portion of said alkyl aluminum chloride present during the polymerization reaction which remains after incomplete stopping of the polymerization reaction by the addition of less than the equimolar amount of a stopping agent and recovering said modified polybutadiene from dispersion in said organic liquid.

6. The process of claim 5 wherein said stopping agent is water.

7. A process of modifying a gel-free rubbery butadiene polymer prepared in the presence of a lithium alkyl or Ziegler catalyst which comprises treating said polymer while dissolved in an inert organic solvent at 10° C. to 80° C. with 0.1 to 10% by weight of the butadiene polymer of a Lewis acid selected from the group consisting of titanium tetrachloride and alkyl aluminum halides to produce a substantially gel-free modified polymer having an increased Mooney viscosity.

References Cited
UNITED STATES PATENTS

| | | | |
|---|---|---|---|
| 2,317,858 | 4/1943 | Soday | 260—86 |
| 2,560,164 | 7/1951 | Garber | 260—94.7 |
| 3,245,974 | 4/1966 | Angelo | 260—94.2 |
| 3,299,032 | 1/1967 | Rollmann | 260—94.7 |
| 3,383,377 | 5/1968 | Uranech et al. | 260—94.7 |

FOREIGN PATENTS

| | | | |
|---|---|---|---|
| 483,815 | 6/1952 | Canada | 260—94.7 |

OTHER REFERENCES

Investigation of the Factors Causing Chain Structure Change in Ionic Diene Polymerization, by Dolgoplosk et al.; Journal of Polymer Science, vol. 53, pp. 209–216 (1961).

JOSEPH L. SCHOFER, Primary Examiner

W. F. HAMROCK, Assistant Examiner

U.S. Cl. X.R.

260—83.3, 85.1, 96